United States Patent Office 3,468,137
Patented Sept. 23, 1969

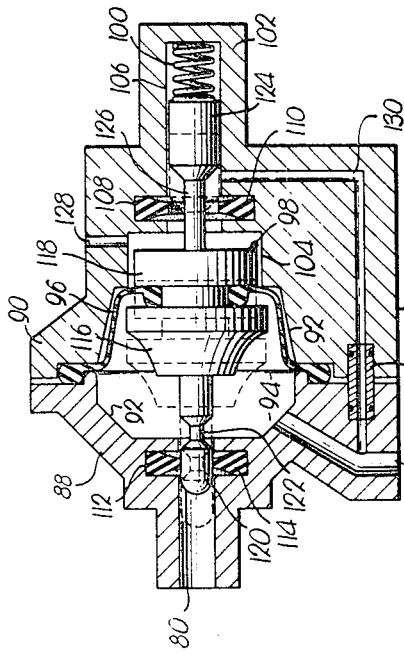

3,468,137
METHOD AND APPARATUS FOR FREEZING AND DISPENSING SLUSH CARBONATED BEVERAGES
Frank Welty, Kansas City, Mo., assignor to The Vendo Company, Kansas City, Mo., a corporation of Missouri
Filed Oct. 30, 1967, Ser. No. 678,999
Int. Cl. F25c 7/16; F04f 1/18; B01f 5/04
U.S. Cl. 62—69                                    7 Claims

ABSTRACT OF THE DISCLOSURE

A method and apparatus for producing a slush carbonated beverage of sufficiently high carborination to present a highly palatable and flavorful liquid refreshment. Carbonated water and a flavoring syrup are supplied under $CO_2$ pressure from respective storage tanks through corresponding flow controls to a common mixing and mix storage area, and thence to a freezer where the slush product is formed. Provision is made to maintain a sufficient $CO_2$ pressure on the mix in the storage area to prevent escape of a significant amount of carbonation therefrom at the particular regulated temperature. Since the flow controls require maintenance of a minimum differential between inlet and outlet pressures for proper operation, valve means is provided to vent the mix storage area to atmosphere during the filling thereof to prevent the pressure on the outlet side of the flow controls from approaching the magnitude of the inlet pressures.

---

This invention relates to a method and apparatus for freezing and dispensing slush carbonated beverages and is particularly concerned with a process and equipment for preparing a frozen slush beverage which is carbonated and wherein an atmosphere of carbon dioxide is maintained on the beverage mix prior to, during, and after the freezing thereof to prevent escape of significant amounts of carbon dioxide therefrom.

Slush beverages which are in the form of particles of ice flavored with syrup have found increasing popularity in recent years but require the use of carbonated water in the preparation thereof to give the most flavorful drink. Although relatively highly carbonated slush beverages have been made available, the equipment necessary to produce a drink of this quality has not only been expensive but difficult to maintain in operation, especially in high volume locations and necessitating frequent adjustment and repair.

In addition, the quality of the slush product dispensed from such machines has varied considerably depending upon the operating conditions encountered and which have been found to fluctuate from day to day. This is especially true as to the pressures of the syrup and carbonated water from the sources of supply thereof and the variation of viscosity of the syrup with changing temperature.

It is, therefore, the primary object of the present invention to provide simplified and essentially trouble-free apparatus for preparing a carbonated slush beverage of relatively high carbonation if desired, and which is capable of dispensing a product of reproducible quality under varying operating conditions including changes in the pressure of the carbonated water and the pressure or viscosity of the syrup or flavoring agent used in association with the carbonated water.

It is a further object of the invention to provide a method and apparatus for producing slush carbonated beverage products wherein a beverage mix storage tank is used in conjunction with the freezing assembly to provide an adequate supply of mix for periods of high volume demand, but without sacrifice to the carbonation level of the product delivered and with the quality thereof being maintained regardless of the frequency of demand removal of the slush material from the freezer.

Another very important object of the invention is to provide a method and apparatus for preparing a slush carbonated beverage wherein the liquid beverage mix storage tank communicates with a control valve which is operable to direct carbon dioxide under pressure to the tank to prevent significant escape of carbon dioxide from the mix during decrease of the volume thereof as slush beverage material is drawn from the freezer and to exhaust excess carbon dioxide gas to the atmosphere during periods of refilling of the storage tank in order to prevent pressure buildup to an extent that would prevent proper operation of the flow control valves.

A still further important object of the invention is to provide apparatus and a method for producing a slush carbonated beverage wherein the quality of the drink is maintained under varying operating conditions through the utilization of flow control valves in the carbonated water and liquid flavoring agent lines leading to the beverage mix storage tank for assuring uniform delivery of carbonated water and the flavoring agent to the tank notwithstanding variations in the pressure of the carbonated water and changes in the pressure or viscosity or both of the flavoring agent delivered to the tank.

Also an important object of the invention is to provide apparatus and a process for producing a slush carbonated beverage wherein the beverage mix tank is located in a position and communicates with the freezer in a manner to assure that the freezer remains full of mix or slush product at all times. Also, by virtue of this arrangement, the liquid beverage mix and slush product are maintained constantly at the appropriate pressure for retention of the required carbonation.

In the drawing:

FIGURE 1 is an essentially schematic representation of apparatus for preparing a slush carbonated beverage in accordance with the preferred concepts of the present invention showing a freezer, a liquid beverage mix storage tank in association therewith, structure for furnishing carbonated water and liquid flavoring agent to the storage tank at a controlled rate, and a pressure responsive control valve for maintaining an atmosphere of carbon dioxide under pressure on the mix in the storage tank during normal delivery of mix from the tank to the freezer but operable to block off the carbon dioxide gas and exhaust excess carbon dioxide from the tank to the atmosphere during refilling of the tank;

FIG. 2 is an enlarged, vertical, cross-sectional view of the pressure responsive control valve shown in FIG. 1; and FIG. 3 is an enlarged, vertical, cross-sectional view of another type of control valve which may be used in lieu of the pressure responsive control valve illustrated in FIGS. 1 and 2.

Although shown schematically for purposes of clarity (FIG. 1), it is to be understood that the apparatus depicted therein will normally be housed within a single cabinet of dimensions to cause the freezer to be located at a convenient level for access by the operator. In addition, although the system shown is illustrated as being of the manually operable type, it is also to be appreciated that the structure shown is equally applicable to be operated as a coin or currency controlled vending machine.

The slush making apparatus shown in FIG. 1 is broadly designated by the numeral 10 and includes a line 12 which is adapted to be connected to a suitable source of water under pressure such as a city water main. The pressure tank 14 is adapted to be received within the cabinet of the machine and serves to supply carbon dioxide under pressure to the system with new cylinders being substituted when the pressure of carbon dioxide in the tank falls to a predetermined low level. The main regulator valve 16 has a gauge 18 thereon, while a line 20 leads from one outlet of regulator valve 16 to a carbonator tank 22 which may be of the type illustrated in U.S. Letters Patent No. 2,588,677. Electrode structure is provided within carbonator 22 for sensing the level of liquid therein and is connected to a level control 24 which is also operably joined to the normally closed solenoid valve 26, as well as to a water pump 28 having the suction side thereof connected to line 12. A conduit 30 is joined to the outlet of pump 28 and leads to carbonator 22 with solenoid valve 26 controlling the flow of liquid therethrough.

A branch line 32 from line 20 communicates with the upper end of a syrup tank 34 containing the liquid flavoring agent for the slush beverage to provide a pressurized atmosphere of carbon dioxide above the liquid in tank 34 and thereby serve as the driving medium for delivering syrup to an area to be blended with carbonated water.

The carbonated water from carbonator 22 and syrup from tank 34 are delivered at metered rates to a beverage mix tank 36 for storage therein. Line 38 leading from the upper end of tank 36 has a solenoid valve 40 interposed therein to control the flow of liquid therethrough, while branch lines 42 and 44 from line 38 upstream of solenoid valve 40 are connected to the outlets of a syrup flow control calve 46 and a carbonated water flow control valve 48, respectively. Conduit 50 leads from syrup tank 34 to the inlet of flow control valve 46, while a conduit 52 intercommunicates carbonator 22 with the inlet of flow control valve 48.

It is desirable that the flow control valves 46 and 48 be of such nature so as to assure uniform flow of respective liquids therefrom regardless of variations in the pressure of these constituents or changes in the viscosity of the syrup 34 with temperature fluctuations. A preferred flow control valve 46 for syrups is shown and described in U.S. Patent No. 3,335,749 while a preferred carbonated water flow control valve is illustrated and described in an application for U.S. Letters Patent Ser. No. 442,054, now Patent No. 3,351,087.

An outlet tube 54 from the lower end of tank 36 communicates directly with the end of cylinder 56 forming a part of freezing assembly 58 of conventional construction. Thus, assembly 58 generally includes not only the horizontally disposed cylinder 56, but also a series of refrigerant tubes 60 around the perimeter thereof, as well as a beater type agitator 62 rotatable about the axis of cylinder 56. A manually operable control gate 64 is provided at the end of cylinder 56 opposite tube 54. It is particularly important to take note of the fact that tube 54 communicates with the cylinder 56 at a point adjacent the uppermost part thereof to avoid trapping of gas in the upper part of the cylinder during operation of the assembly 58.

Liquid level control structure 66 is provided for tank 36 and includes high and low level sensing electrodes 68 and 70 which are joined by suitable electrical connections to a controller 72 which is also operably connected to solenoid valve 40 for controlling energization of the latter. The level controller 66 is operable to effect energization of solenoid valve 40 whenever the level of liquid in tank 36 falls below the lower end of electrode 70 and functions to de-energize the solenoid valve 40 when the liquid in tank 36 climbs to a level to engage the lower end of electrode 68.

A line 74 connects the upper end of tank 36 to a passage 76 of a pressure-responsive control valve broadly designated 78. The carbon dioxide inlet passage 80 of valve 78 has a carbon dioxide supply line 82 joined thereto which is, in turn, coupled to another regulator valve 84 on regulator valve 16. Gauge 86 of regulator valve 84 permits a reading of pressure in line 82.

As is best evident from FIG. 2, the valve 78 comprises a pair of separate sections 88 and 90, each having a cup-shaped chamber 92 therein which cooperates to define an inner compartment 94 communicating with passages 76 and 80. An annular flexible diaphragm 96 clamped between sections 88 and 90 within compartment 94 receives a shiftable valve member 98 which is normally biased into the dotted-line position thereof by a spring 100 received within cylindrical extension 102 of section 90. Although not specifically illustrated in the drawing, it is to be understood that cylindrical extension 102 may comprise a cup-shaped member threaded onto the nipple forming a part of section 90 to permit adjustment of the spring 100.

The chamber 92 in section 90 is also aligned with a generally cylindrical cutout 104 of smaller diameter which, in turn, communicates with an elongated bore 106 which projects into extension 102. An annular notch 108 in section 90 surrounding bore 106 adjacent cutout 104 receives an annular flexible washer 110 coaxially with bore 106. An annular notch 112 in section 88 circumscribing passage 80 adjacent chamber 92 receives another annular flexible washer 114 similar to washer 110.

The slide valve member 98 has a pair of enlargements 116 and 118 thereon which are in spaced relationship to define an annular notch receiving the innermost circular area of diaphragm 96. The left-hand shaft portion 120 of member 98 which is essentially of the same diameter as passage 80 viewing FIG. 2, has an area of reduced diameter 122 which aligns with washer 114 when member 104 is in the normal position thereof as illustrated by the dotted lines of FIG. 2. The right-hand shaft portion 124 of valve member 98, and which is of a diameter substantially equal to the inner diameter of bore 106 in extension 102, has an area 126 of reduced diameter which is aligned with washer 110 when the valve member 98 is in the actuated position thereof as shown by full lines in FIG. 2.

Port 128 in section 90 of valve 78 communicates cutout 104 with the atmosphere, while an L-shaped passage 130 extends from passage 76 to bore 106. The tube 132 in passage 130 at the zone of merger of sections 88 and 90 has O-rings at opposite ends thereof to provide a seal against leakage of fluid from passage 130 where sections 88 and 90 join.

In a typical operation, it is necessary that a pressure differential be provided across flow control valves 46 and 48 sufficient to assure proper operation thereof and which normally would be of the order of 15 p.s.i. Thus, assuming that it is desired to maintain a carbon dioxide gas pressure on the liquid in tank 36 at about 10 p.s.i., then regulator 16 should be adjusted to provide a pressure of 35 p.s.i. in line 20 and branch line 32 while regulator 84 is adjusted to provide a carbon dioxide pressure in line 82 of about 10 p.s.i. It is to be understood however, that these levels may be readily adjusted to provide a higher carbon dioxide pressure in tank 36 if desired.

During initial operation of apparatus 10, the level control structure forming a part of carbonator 22 senses that the level of water therein is at a low point thereby causing pump 28 to be actuated in association with energization of solenoid valve 26. Accordingly, water under pressure is forced into the carbonator 22 at the same time that carbon dioxide is directed thereinto via line 20 and producing carbonated water having a required degree of carbonation which is stored in tank 22. As soon as the level reaches a preselected high point as indicated by the dotted lines across carbonator 22, the level of the carbonated water is sensed and control 24 deactivates the pump 28 and solenoid valve 26 to discontinue delivery of water into the tank. It is to be understood as is fully explained in U.S. Patent No. 2,588,677 that the level-sensing structure is operable to direct water along with carbon dioxide into the carbonator when the level of carbonated water reaches a predetermined low level and until the level of the carbonated water reaches a high point which is sensed by electrode structure forming a part of the control mechanism. Similarly, additional water will not be directed into the carbonator until after the carbonated water reaches a predetermined low level as indicated by the dotted lines across the lower end of tank 22 in FIG. 1.

Since the tank 36 is initially devoid of liquid, the low level thereof will be sensed by control 66, thereby causing the solenoid valve 40 to be energized and permitting flow of liquid therethrough. Accordingly, upon preparation of carbonated water in carbonator 22, the carbonated water will be directed into tank 36 via conduit 52, branch line 44 and line 38. Similarly, syrup or liquid flavoring agent will be permitted to flow through conduit 50 and branch line 42 into line 38 for delivery into tank 36 under the pressure of carbon dioxide on the syrup entering tank 34 via line 32. The flow controls 46 and 48 assure proper flow of syrup and carbonated water respectively therethrough at all times notwithstanding variations in the pressure of the carbonated water or changes in the pressure or viscosity of the syrup.

When the level of beverage mix received in tank 36 reaches a level to contact electrode 68, solenoid valve 40 is de-energized thus cutting off the flow of liquid into tank 36. However, liquid beverage mix from tank 36 is also permitted to flow into freezer assembly 58 through tube 54, and as the mix is agitated and subjected to the low temperatures present therein, the mix forms a layer of ice on the inner surface of cylinder 56 which is scraped therefrom by beater 62, thus producing a slush beverage. In this connection it is to be understood that beater 62 is driven by a suitable drive train and motor forming a part of the machine. Also, the temperature within cylinder 56 is controlled thermostatically and is maintained just below the freezing temperature of the water having the required amount of syrup therein so that a slush product will be dispensed, but not so low as to cause freeze-up of liquid within assembly 58.

The valve 78 performs the very important function of maintaining a carbon dioxide gas pressure on the mix in tank 36 so that the carbonated beverage dispensed through gate 64 is of required carbonation at all times. Thus, during feeding of beverage mix into cylinder 56 via tube 54, carbon dioxide from tank 14 is permitted to flow into the upper end of tank 36 via regulator 84, line 82, passage 80, compartment 94, passage 76, and line 74. In this manner, carbon dioxide at a pressure of 10 p.s.i. is maintained over the liquid in tank 36. As the liquid level falls in tank 36, the pressure is maintained constant because of additional carbon dioxide flowing into the tank via line 74.

However, when the solenoid valve 40 is energized through control 66 when the level of liquid falls to the lower dotted line in tank 36 as sensed by electrode 70, additional liquid is permitted to flow into tank 36 via line 38, thereby causing an increase in pressure above the level of liquid in tank 36. This increased carbon dioxide pressure in tank 36 and consequently line 74, as well as passage 76, causes the valve member 98 to be shifted to the right into the position thereof shown in FIG. 2 whereby passage 80 is first closed by engagement of the outer end of shaft 120 with washer 114 while passage 76 is immediately thereafter communicated to the atmosphere through passage 130, bore 106, cutout 104 and port 128. In this position of the valve, the section 126 of shaft 124 is aligned with washer 110 thus permitting flow of gas past the washer to port 128. Passage 80 closes before passage 130 opens to passage 128 and vice versa to prevent loss of carbon dioxide supply from line 82. The excess carbon dioxide in tank 36 is thus exhausted to the atmosphere during filling of the tank. Upon discontinuance of introduction of beverage mix into the storage tank 36 as controlled by de-energization of solenoid valve 40, the pressure in tank 36 decreases and permits valve member 98 to return to the normal position thereof under the influence of spring 100.

An alternative commercially obtainable control valve is illustrated in FIG. 3 which can be used in place of pressure responsive valve 78. In this instance, the electrically actuated valve, broadly designated 178 has a section 188 which is threaded into main section 190 to define a compartment 194 therewithin. Gas inlet passage 180 communicates with compartment 194, while a passage 176 in section 190 and also communicating with compartment 194 at the end thereof opposite passage 180, is adapted to be coupled to line 74 leading to tank 36.

A cup-shaped extension 202 threaded into the end of section 190 away from section 188, receives a spring 200 which acts against the integral cylindrical enlargement 218 of shaft 224 of a shiftable valve member 198. Flexible valve seat 258 is affixed to the left hand face of shaft enlargement 218 to normally close the right hand end of bore 284 in section 190 under the bias of spring 200. Shiftable valve member 220 which is received within compartment 194 has flexible valve seats 250 and 252 on opposite ends thereof for sealing off the passage 180 and bore 254 in section 188 and section 190 respectively. Spring 256 within compartment 194 between passage 180 and the proximal end of member 220 serves to bias the same in a direction to the right viewing FIG. 3.

The extension 202 has a pair of exhaust ports 228 therein. A coil 260 surrounding section 188 is operable to effect shifting of valve member 220 to the left upon energization of the coil.

In this construction, the coil 260 is electrically coupled to control 66 so that the coil is energized when the liquid level reaches the low point as sensed by electrode 70 and maintains coil 260 energized until the liquid level reaches the upper point sensed by electrode 68. During the period that coil 260 is energized, the valve member 220 is shifted to the left against the action of spring 256 whereby flow of carbon dioxide from tanks 14 to tank 36 is interrupted as the flexible seat 258 engages section 188 in closing relationship to passage 180. At the same time, bore 254 is opened to passage 176 and the excess gas in tank 36 is permitted to exhaust to the atmosphere through line 74, passage 176, compartment 194, passage 254, past the valve seat 258, the bore of extension 202 and out into the atmosphere through vents 228. That is, carbon dioxide is exhausted to the atmosphere from tank 36 whenever the pressure therein exceeds a set value, for example, about 10 p.s.i. and thus overcomes the force of spring 200.

De-energization of coil 260 permits the valve member 220 to shift to the right thus again communicating passage 180 with compartment 194 for flow of carbon dioxide to tank 36 via passage 176 and line 74.

It can therefore be seen that the liquid beverage mix in tank 36, as well as the slush product in cylinder 56, are maintained constantly at the appropriate pressure for the retention of the required carbonation therein at the regulated temperature.

Having thus described the invention, what is claimed as new and desired to be secured by Letters Patent is:

1. A method of preparing a slush carbonated beverage comprising the steps of:
  directing carbonated water and a flavoring agent along separate paths from pressurized supply sources thereof;
  controlling the flow rates of carbonated water and said flavoring agent to compensate for fluctuations therein because of variations in the pressure of the carbonated water and changes in the pressure and viscosity of the flavoring agent;
  combining the carbonated water and flavoring agent to produce a liquid beverage mix;
  directing beverage mix into a storage area thereof until the height of the mix reaches a predetermined upper level;
  then discontinuing the delivery of the beverage mix to said area until the level of beverage mix therein falls to a predetermined lower level;
  passing the beverage mix into a freezing zone at a sufficiently low temperature to cause transformation of the liquid mix into a particulate slush product;

maintaining an atmosphere of carbon dioxide on the beverage mix stored in said area at a sufficient pressure to prevent escape of significant amounts of carbon dioxide therefrom;

communicating the area with the atmosphere for exhaustion of carbon dioxide thereto during each filling of the area with beverage mix;

supplying additional carbon dioxide under pressure to the area as beverage mix is delivered from the area to said freezing zone; and maintaining an atmosphere of carbon dioxide on the liquid mix during freezing thereof, at a sufficient pressure to preclude escape of significant amounts of carbon dioxide therefrom prior to delivery thereof from the zone.

2. A method as set forth in claim 1, wherein is included the step of:

communicating the area to the atmosphere after blocking supply of carbon dioxide under pressure to said area during filling of the area with liquid beverage mix to prevent loss of carbon dioxide from the pressurized source thereof.

3. A method as set forth in claim 2, wherein is included the steps of:

collecting the liquid beverage mix in an area located above said freezing zone; and communicating the area with said zone for feeding of the liquid beverage mix by gravity from the lower part of the area to the zone.

4. A method as set forth in claim 1, wherein is included the steps of:

dropping the pressure of the carbonated water and said flavoring agent prior to introduction of the same into said area; and sensing variations in the flow rates of the carbonated water and liquid flavoring agent across said points of pressure drop to maintain substantially constant the average relative flow rates of the carbonated water and flavoring agent delivered to said area and thus retain the required balance therebetween.

5. Apparatus for producing a slush carbonated beverage comprising:

separate pressurized sources of carbonated water and a liquid flavoring agent;

conduit means connected to each of said sources for conveying the carbonated water and flavoring agent therefrom along separate paths;

collection means for receiving the carbonated water and flavoring agent therein to produce a liquid beverage mix;

a line joining the conduit means to said collection means;

selectively operable valve means interposed in said line for interrupting flow of liquid therethrough;

flow control means in each of said conduit means for controlling the flow rates of the carbonated water and flavoring agent respectively fed into said collection means to compensate for fluctuations in said rates because of variations in the pressure of the carbonated water and changes in the pressure and viscosity of the flavoring agent;

liquid level sensing mechanism in said collection means;

a control unit operably coupled to said level sensing mechanism and to said selectively operable valve means in said line for effecting operation of the valve means to permit flow of liquid through the line when the level of liquid in said collection means reaches a selected low point therein and to again actuate said valve means to interrupt flow of liquid through the line when the level of liquid in the collection means reaches a selected high point;

a source of pressurized carbon dioxide;

a carbon dioxide line leading from said carbon dioxide source to the collection means at a point above the normally uppermost level of liquid beverage therein;

a control valve in said carbon dioxide line having a passage therethrough communicating with said carbon dioxide line, a port joined to said passage and leading to the atmosphere, and a shiftable device for closing the port when in one position thereof and for closing said carbon dioxide line while communicating the port with the collection means when in another position of the same; and a freezing assembly coupled to said collection means for receiving liquid beverage mix therefrom and operable to transform the latter into a particulate slush product.

6. Apparatus as set forth in claim 5, wherein said control valve includes pressure responsive means coupled to said shiftable device for shifting the latter from said one position thereof to said second position of the same in response to a significant increase in pressure in the collection means caused by refilling of the latter with said liquid beverage mix.

7. Apparatus as set forth in claim 5, wherein said control valve includes electro-magnetic means, shiftable means operated by said electro-magnetic means for closing the carbon dioxide line to the collection means and communicating the latter with a pressure actuated purging means upon energization of said electro-magnetic means, said purging means thereupon being operable in response to a significant increase in $CO_2$ pressure in the collection means during refilling of the same with said mix for venting the collection means to atmosphere, said electro-magnetic means being operably coupled to said control unit for energization and de-energization thereby.

References Cited

UNITED STATES PATENTS

| | | | |
|---|---|---|---|
| 2,947,316 | 8/1960 | Walker | 137—208 X |
| 3,044,878 | 7/1962 | Knedlik | 62—306 X |
| 3,222,035 | 12/1965 | Lutz et al. | 62—342 X |
| 3,348,737 | 10/1967 | Yingst et al. | 222—136 X |
| 3,398,550 | 8/1968 | Lents | 62—179 |

WILLIAM E. WAYNER, Primary Examiner

U.S. Cl. X.R.

62—179, 306; 137—208; 222—3